United States Patent [19]

Lackey

[11] Patent Number: 4,920,452
[45] Date of Patent: Apr. 24, 1990

[54] METALLIZED CAPACITOR WITH CORROSION RESISTANT ELECTRODES

[75] Inventor: Donald V. Lackey, Salt Point, N.Y.

[73] Assignee: Dunmore Corporation, Brewster, N.Y.

[21] Appl. No.: 408,808

[22] Filed: Sep. 18, 1989

[51] Int. Cl.$^5$ ............................................. H01G 1/017
[52] U.S. Cl. .................................................. 361/305
[58] Field of Search ............................. 361/303–305, 361/323, 324

[56] References Cited

U.S. PATENT DOCUMENTS 4,190,878  2/1980  Förster .................................. 361/305
4,482,931  11/1984  Yializis ........................... 361/305 X Primary Examiner—Donald A. Griffin
Attorney, Agent, or Firm—Haynes N. Johnson

[57] ABSTRACT

Corrosion of the aluminum electrode layer in thin-film capacitors is inhibited or prevented, so that the capacitors can be operated at higher AC voltages. The aluminum is alloyed with copper (or other metal of low specific resistance) from about 0.2% to about 8.0% (by weight), and with about 0.2% to about 3.0% of metal having a higher valence than aluminum, such as chromium, hafnium, manganese, titanium, and zirconium. Because of its low specific resistance and its ability to form precipitate compounds with aluminum, the copper serves as a vehicle to transport the high valence metals to the grain boundary of the aluminum. The presence within the alloy of a metal having a higher valence than aluminum is believed to capture free electrons and so prevent a positive shift in pH, thus inhibiting corrosion.

13 Claims, 1 Drawing Sheet

METALLIZED CAPACITOR WITH CORROSION RESISTANT ELECTRODES

FIELD OF THE INVENTION

This invention relates to the field of capacitors formed of metallized foil and, in particular, to AC capacitors having electrodes formed of those thin aluminum layers which tend to corrode under high field strength. It is directed to a capacitor in which such corrosion is substantially inhibited or prevented, rather than healed. This invention will permit use of higher voltages and greater utilization of the dielectric strength of the dielectric film without loss of capacitance.

BACKGROUND OF THE INVENTION

It has long been known that aluminum tends to corrode in the presence of high voltage AC electrical fields. This has placed a limitation upon the use of metallized film capacitors using aluminum for their electrodes.

Efforts to solve this problem are represented, for example, by Forster U.S. Pat. Nos. 4,190,878 and 4,305,111. The first of these uses plastic sheets, such as polypropylene, coated with aluminum containing a small percentage of copper. The other adds Ni, Mg, Ti, Hf, or Be to the aluminum electrode. Similarly, British patent 1,546,354 forms electrodes from a coating of aluminum with another metal having a low specific resistance, such as Cu, Zn, Mn, Sn, Cr, Fe, and Pb. This work was directed at the use of semiconductive oxides which when formed reduce the high field associated with the edge of the corrosion sites and thus self heals the corrosion process. By contrast, my capacitor corrodes little, if at all, and, so, does not need to be self-healing.

My electrode of my capacitor controls the pH in the vicinity of the aluminum oxide thus preserving its protective qualities and so prevents corrosion of the elemental aluminum, rather than, as in the past, using a combination of metals which serve to heal the corrosion after it has occurred.

BRIEF SUMMARY OF THE INVENTION

The object of my invention is to inhibit or prevent the corrosion of the aluminum electrode layer in thin-film capacitors, so that the capacitors can be operated at higher AC voltages. This allows for greater utilization of the dielectric strength of the dielectric film without loss of capacitance.

My capacitor uses an aluminum ternary alloy vapor deposited upon a dielectric strip, such as a thin plastic film. This ternary alloy contains aluminum, copper (or other metal of low specific resistivity) and at least one metal having a higher valence than aluminum.

The electrode alloy is aluminum containing from about 0.2% to about 8.0% (by weight) of copper and from about 0.2% to about 3.0% of metal having a higher valence than aluminum, such as chromium, hafnium, manganese, titanium, and zirconium. Because of its low specific resistivity and its ability to form precipitates with other metals, the copper serves as a vehicle to transport the high valence metals to the grain boundary of the aluminum.

The presence within the alloy of a metal having a higher valence than aluminum serves to capture free electrons which are produced and thereby prevent the formation of hydrogen gas which depletes the H+ ions causing a positive shift in pH. By stabilizing the pH, the protective layer of aluminum oxide is maintained, thus inhibiting the corrosion of the elemental aluminum metal.

DETAILED DESCRIPTION OF THE INVENTION

The capacitor 1 of my invention uses certain specific ternary aluminum alloys for one or both of the electrode coatings on a dielectric. The dielectric is a plastic film, usually polypropylene, polycarbonate, or polyester, with a thickness varying normally from about 6 $\mu$m to about 8 $\mu$m. The alloy is coated on at least one side of the dielectric in a thickness of from about 120 Å to about 150 Å in the field area and from about 260 Å to about 330 Å at the edges. The coating is applied to the dielectric by any of the usual methods, such as vapor deposition.

Figure 1:
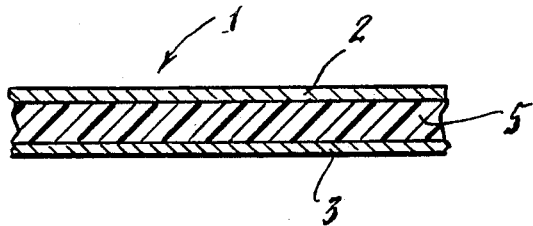
FIG. 1 is a partial section across a typical capacitor showing an electrode on each side of a dielectric.

A partial cross section of the capacitor 1 is seen in FIG. 1. The two electrode layers 2 and 3 are coated on opposite sides of the plastic film 5.

At least one of the electrodes is formed of an aluminum alloy which is principally aluminum but which contains an evenly distributed amount of copper, about 0.2% to about 8.0% by weight, preferably about 2% to about 6%, and at least one of the metals chromium, hafnium, manganese, titanium, and zirconium, totalling from about 0.2% to about 3% by weight, preferably between about 1.0% and 1.5%. The alloy is formed as a single layer, not as a multiple layer electrode. The copper is used primarily as a vehicle to transport the high valence metals to the grain boundary; other metals may be substituted for the copper provided they have a specific resistance between about 1.6 and about 5 microhm centimeter and can be evaporated without significant distillation.

In one test I used a commercially available alloy, known as 2319, under National Standard ANSI-H35.1-1982. This alloy is aluminum with about 5.8% to about 6.8% of copper (my sample was about 6.0%) and about 0.2% to about 0.4% of manganese. It has specified impurity limitation of 0.2% Si, 0.3% Fe, 0.02% Mg, 0.1% Zn, 0.02% to 0.2% ti, and 0.15% other. The alloy was deposited to a thickness of about 120 Å to about 150 Å on each side of a sheet of polypropylene film which was about 8 $\mu$m thick. Experimental test results are shown in FIGS. 2 and 3.

Figure 2:
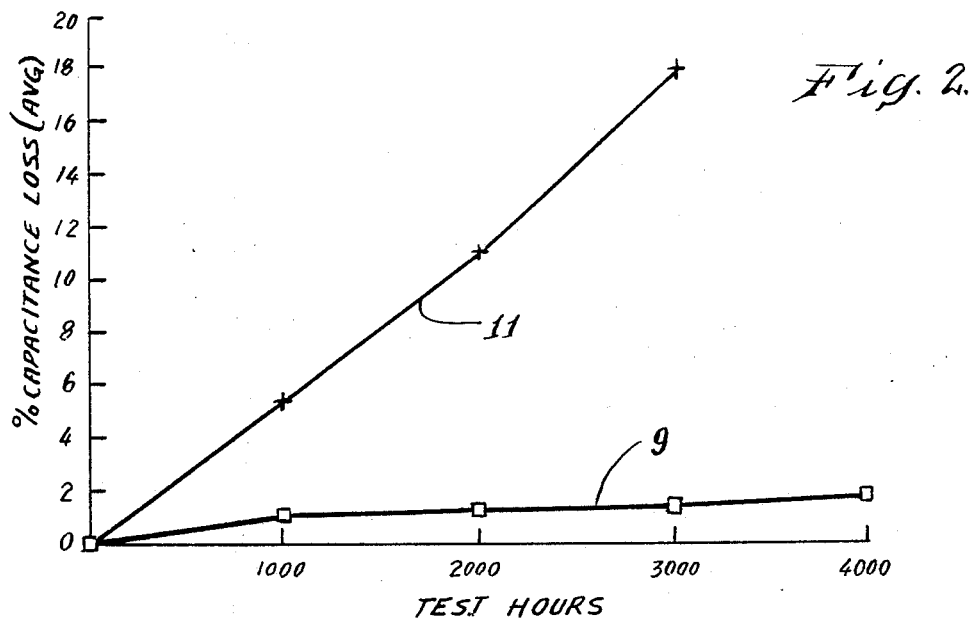
FIG. 2 is a graph comparing the capacitance loss over time of a capacitor using a prior art aluminum electrode with a capacitor using the electrode of my invention. These graphs are based upon experimental results.

Curve 9 in FIG. 2 shows the average percent capacitance loss over time for the capacitor described above. As can be seen, the loss amounts to only about a 2% loss over 4,000 hours of testing. By comparison, curve 11 in that Figure shows the same results with a similar aluminum electrode capacitor, 99.9% Al. There the average capacitance loss increases linearly with time and reaches about 18% in about 3,000 test hours. Both tests were run on 12 $\mu$f capacitors at a field strength of 550 volts AC at 60 hertz, and the capacitors were thermocycled to 100° C. in 24 hour cycles.

Figure 3:
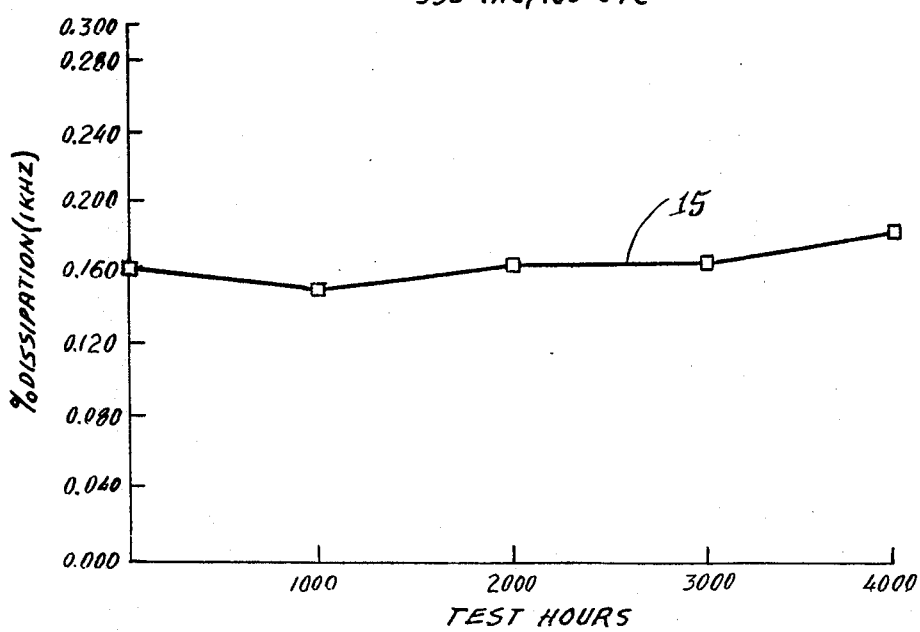
FIG. 3 is a graph showing how the dissipation of a capacitor using my electrodes remains low and relatively constant over time.

Other test results with my above-described capacitor are shown in curve 15 of FIG. 3. There, under the same test conditions, but at a frequency of 1000 hertz, the percentage of dissipation remained essentially constant over a 4,000 hour test, being in the range between about 0.160% and 0.180%.

Other commercially available aluminum alloy formulations which can be used are 2014, 2017, 2018, 2024, 2025, 2036, 2117, 2124, 2218, 2219, 3003, 3004, 3005, and 3105.

The previously-observed corrosion in prior capacitors is effectively prevented in my system, and capacitors made of such metallized polypropylene, polycarbonate, or polyester film can tolerate nominal AC stresses of up to 70 v./$\mu$m.

I developed my capacitor on the basis of a postulated theory which rested upon the known fact that the corrosion of metallized electrode layers of aluminum occurs as a function of AC field strength. In a theory postulated by W. H. French et al. this corrosion is not the result of strictly chemical forces, but takes place as a result of electro-chemical forces causing a local pH shift in the base direction. See W. H. French, "Alternating Current Corrosion of Aluminum," IEEE, PES Winter Meeting, New York, N.Y., February 1973). This results in a dilution of the already produced $Al_2O_3$ followed by further oxidation of the elemental aluminum as follows:

It is assumed that, before and during the application of the AC voltage, the solution contains $H^+$ and $OH^-$ ions. During the positive cycle aluminum ions $Al^{+++}$ will be repelled from the metal into the oxide or the solution that flows in the oxide layer. These $Al^{+++}$ ions, during the positive cycle, will react with water to produce a hydrated form of aluminum oxide:

$$2Al^{+++} + 3H_2O + 6e^- \longleftrightarrow Al_2O_3 + H_2$$

or $$2Al^{+++} + 4H_2O \longleftrightarrow (Al_2O_3 \cdot H_2O) + 6H^+$$

The $H^+$ ions move away from the metal surface and the $OH^-$ ions towards it, causing a local pH shift in the base direction.

During the negative cycle the aluminum oxide conducts electrons to the attracted $H^+$, and hydrogen gas is produced:

$$2H^+ + 2e^- \rightarrow H_2$$

The depletion of the area of $H^+$ increases the concentration of $OH^-$ further. The high values of pH lead to the corrosion of aluminum due to a dilution of the already produced $Al_2O_3$:

$$Al_2O_3 + 2OH^- \longleftrightarrow 2AlO_2^- + H_2O$$

Therefore, during the negative cycle, the original oxide is destroyed and more flaws are created. Some of the flaws will be healed by the positive cycle, but the overall effect will be continuous corrosion.

By contrast, using my invention, the corrosion described above is inhibited by the presence of the ternary aluminum alloy. The ternary phase of this alloy is a precipitate such as $Al_{20}Cu_2Mn_3$ that contains a metal with a higher valence than aluminum, thus capturing the free electrons and preventing the formation of hydrogen gas and the resulting positive shift in pH.

I claim:

1. A capacitor adapted to inhibit corrosion in the presence of high AC voltages, said capacitor including a foil dielectric, electrode coatings on at least one side of said foil dielectric, said electrode coatings being formed of an aluminum alloy,
said alloy containing aluminum, from about 0.2% to about 8.0% by weight of copper, and from about 0.2% to about 3% by weight of a metal having a higher valence than aluminum.

2. A capacitor as set forth in claim 1 in which said higher valence metal is selected from the group including chromium, hafnium, manganese, titanium, and zirconium.

3. A capacitor as set forth in claim 1 including at least two different said higher valence metals.

4. A capacitor as set forth in claim 1 in which said copper is present in about 2% to about 6% by weight of aluminum.

5. A capacitor as set forth in claim 4 in which said higher valence metal is present in about 1.0% to about 1.5% by weight of aluminum.

6. A capacitor as set forth in claim 1 in which said higher valence metal is present in about 1.0% to about 1.5% by weight of aluminum.

7. A capacitor as set forth in claim 1 in which said copper is present in about 5.8% to about 6.8% by weight, said higher valence metal is manganese, and said manganese is present in about 0.2% to about 0.4% by weight.

8. A capacitor as set forth in claim 1 in which said higher valence metal is selected from the group including chromium, hafnium, manganese, titanium, and zirconium.

9. In an electrical capacitor having a dielectric and an electrode aluminum alloy coating on said dielectric and an opposed electrode, the improvement comprising including copper and manganese in said aluminum alloy, said copper being present in a proportion between about 2% to about 6% by weight and said manganese being present in a proportion from about 1.0% to about 1.5% by weight,
whereby corrosion of said aluminum will be inhibited even in the presence of high voltage AC fields.

10. A capacitor capable of withstanding dissipation even in the presence of high voltage AC fields, said capacitor including
a foil dielectric, a pair of electrodes, one of said electrodes being coated on one side of said dielectric and the other of said electrodes being coated on the other side of said dielectric,
said electrodes being formed of aluminum alloy, said alloy containing about 0.2% to about 8.0% of copper by weight and a total weight from about 0.2% to about 3% by weight of at least one of the metals from the group including chromium, hafnium, manganese, titanium, and zirconium.

11. A capacitor as set forth in claim 10 in which the metal from said group is manganese.

12. A capacitor as set forth in claim 10 in which said copper is present in about 5.8% to about 6.8% by weight and said metal from said group is manganese, said manganese being present in about 0.2% to about 0.4% by weight.

13. A capacitor adapted to inhibit corrosion in the presence of high AC voltages, said capacitor including a foil dielectric, electrode coatings on at least one side of said foil dielectric, said electrode coatings being formed of an aluminum alloy, said alloy containing aluminum, from about 0.2% to about 8.0% by weight of a metal having a specific resistance between about 1.6 and about 5 microhm centimeter and from about 0.2% to about 3% by weight of a metal having a higher valence than aluminum.

* * * * *